PULSE GENERATING CIRCUITS

Filed Nov. 22, 1955

INVENTORS:
WILLIAM S. GRAFF-BAKER,
DAVID J. STOREY,

BY Michael Masnik
THEIR AGENT.

2,923,841

PULSE GENERATING CIRCUITS

William Sebastian Graff-Baker, Dunchurch, and David John Storey, Rugby, England, assignors to The British Thomson-Houston Company Limited, a British company Application November 22, 1955, Serial No. 548,458

10 Claims. (Cl. 307—106)

This invention relates to pulse generating circuits, and more particulary to generating circuits of the type in which energy is stored in a pulse forming network and is periodically discharged into a load by operation of a switching device.

It is usually found that in such a circuit a reverse voltage appears across the switching device immediately following the discharge which may be caused by unavoidable mismatch between the load and the pulse forming network, pulse transformer magnetizing current, and stray capacitance associated with the load and the transformer windings, and is accentuated by the action of a load such as a magnetron which has a non-linear voltage-current characteristic.

A switching device in a circuit of this kind usually takes the form of a gas discharge device such as a thyratron or ignitron. Then the application of negative anode voltage immediately following the forward discharge gives rise to sputtering of the anode due to positive ion bombardment. This condition leads to gas clean-up in the thyratron and mercury sludging in an ignitron, and in both cases results in short life.

In the prior art high vacuum diodes connected in shunt with the discharge device have been used to minimize the negative anode voltage, but these are not completely effective and diodes suitable for use with pulse generators of present output power have not yet been developed. In addition, this circuit is not applicable to pulse circuits employing an alternator charging system.

One object of the present invention is to prevent the rise of negative anode voltage across a gas discharge switching device.

Another object of this invention is to delay the application of such negative anode voltage across a gas discharge switching device until the discharge space is deionized sufficiently to avoid serious sputtering.

A further object of this invention is to provide signal control means for pulse circuits.

A circuit constructed in accordance with one embodiment of the present invention comprises an energy storage circuit, a discharge circuit for discharging the energy stored in the storage circuit into a load circuit, and a saturable inductor connected in series with said discharge circuit.

In accordance with a modification of the invention a saturable reactor is connected in the discharge circuit. This circuit will provide control of the rate of rise of pulse voltage, pre-pulse ionization of the gas discharge switching device, and provides a pre-pulse for triggering monitoring equipment in addition to the main object of preventing application of negative anode voltage to gas discharge switching device.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawings in which:

Figure 1:
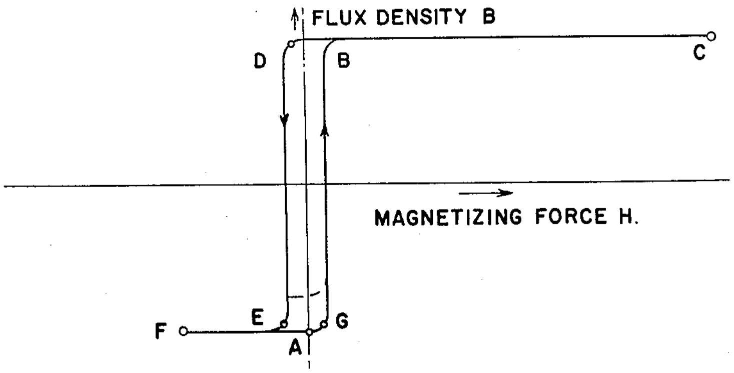
Figure 1 illustrates hysteresis characteristic of a saturable inductor suitable for use with this invention.

In Figure 1 of the drawings the charactertistics of a saturable inductor suitable for use with this invention is shown. The saturable inductor is a coil wound on a core having a B—H loop as shown in Figure 1. When the core is in magnetic saturation, that is in the portions of the loop, BCD and EFG, the reactor has a small inductance. In the unsaturated state, represented by a portion of GB and DE, it has a high inductance common to iron core inductors.

Figure 2:
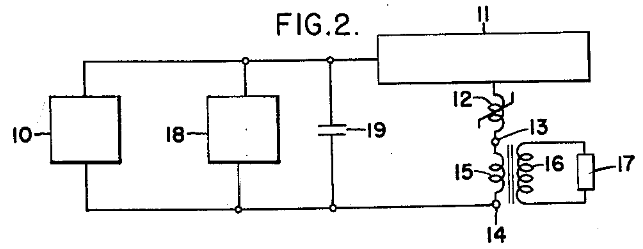
Figure 2 is a schematic diagram of a circuit constructed in accordance with the present invention.

In Figure 2 of the drawings one embodiment of the pulse generating circuit according to the present invention is shown to include a source 10 for charging the circuit, having one of its terminals connected through an energy storage device or pulse forming network 11 and a saturable inductor 12 to the terminal 13. Pulse forming network 11 in one embodiment comprises a plurality of series inductors and a plurality of shunt capacitors. The remaining terminal of source 10 is connected directly to terminal 14. The utilization circuit such as the primary winding of a load coupling transformer is connected across terminals 13 and 14. The secondary 16 of the load transformer is connected serially with the load 17. A switching device, such as a thyratron 18, is connected in shunt across the source. The capacitance 19 represents the stray capacitance across the switching device 18. The capacitance includes the tube inter-electrode capacitance and the stray capacitance of the pulse forming network.

The saturable inductor 12 is dimensioned so that when the core is in the unsaturated state it has a relatively high inductance and its impedance is much greater than that of both the load referred to the primary 15 of the coupling transformer and the stray capacitance 19 across the switching device. When the core is in magnetic saturation the inductor 12 has such as small inductance that its impedance in the circuit is negligible. The operation of this invention may be best understood by reference to Figure 1 and 2 together.

If the pulse forming network 11 of Figure 2 is initially considered as fully charged and the saturable inductor 12 is considered to be at point A on its hysteresis curve as illustrated by Figure 1, the operation of the circuit for the rest of the cycle is as follows:

When the switching device such as the thyratron 18 is triggered, the energy stored in the pulse forming network 11 will flow through the circuit, including the switching device, pulse forming network, saturable inductor and the utilization circuit. The small current flowing through the windings of the saturable core inductor will carry the core saturation to the unsaturated state illustrated as point G in Figure 1.

When the core or the saturable core inductor is unsaturated the saturable inductor is the highest impedance element in the circuit. Therefore, almost the full charging voltage appears across the saturable inductor, remaining there until the flux in the core is built up to saturation, illustrated as point B in Figure 1.

When the core of the inductor saturates, the inductor assumes a very low value and effectively connects the pulse forming network directly to the utilization circuit. The energy stored in the pulse forming network is discharged into the utilization circuit. In so doing, the core is forced up to point C by the discharge current for the duration of the pulse.

At the end of the pulse discharge period, any residual reverse voltage on the transformer windings of the pulse forming network will cause the current to flow in a direction opposite to that of the current flow during the main pulse. A very small current flow carries the core back to the unsaturated state, point D in Figure 1. When the core is unsaturated, the inductor is again the highest impedance element in the circuit, and any reverse voltage which would otherwise have appeared across the switch 18 is now dropped across the inductor 12. The voltage will appear across the inductor 12 until the core flux is built up to the saturated state, point E on Figure 1. The time interval required to saturate the core through the action of this reverse voltage depends upon the magnitude of the reverse voltage, and the turns-core area of the saturable core inductor.

When the cause of the reverse voltage is residual charge on the transformer winding capacitance, the time interval to reach saturation may be long enough for the stored energy to be dissipated in the transformer core or other resistive shunt circuit elements. In this event, reverse voltage is completely prevented from reaching the switching device, for example, the anode of a thyratron.

If, however, due to load mismatch or transformer magnetizing current a reverse charge is left on the pulse forming network which cannot be dissipated in the resistance, the reactor will still operate efficiently by withholding negative voltage from the thyratron anode when such a switching device is used, until the thyratron has sufficiently deionized to avoid serious sputtering. A large residual charge will carry the core into saturation, such as illustrated by point F in Figure 1. As soon as this reverse voltage has died out, the core will return to point A completing the cycle and readying the circuit for the next pulse.

Although it is usually possible to make the unsaturated impedance on the saturable core inductor much larger than the impedance of the stray capacitance 19, it may not always be practical. In this event, as will be obvious to those skilled in the art, a capacitor may be connected in shunt with the switching device to augment the stray capacitance across the pulse network.

An alternate position in the circuit for placement of the saturable core inductor is by connection in series with the switching device. If a gas thyratron is used, the inductor will be connected to the anode.

Operation is essentially the same as described above except that there is no network charging current to drive the core to point F in Figure 1. The bottom end of the hysteresis loop would take a form such as that represented by the dotted line in Figure 1. Of course, with such a connection the stray capacitance across the switch would not include the stray capacitance of the pulse forming network. The stray capacitance should be increased by a resistance and capacitance network connected in shunt with the switching device 18. Such design changes should be readily apparent to those skilled in the art.

Although the main object of our invention is to prevent a negative voltage appearing at the switching device, particularly the anode of a gas discharge tube, and thereby causing damage to the switching device, there are inherent features which are advantageous in specialized applications.

It is evident from the foregoing description that the start of flow of pulse current is controlled by the core of a saturable reactor going in the saturation. Therefore, the rate of buildup of current is controlled not only by the characteristic of the network, but also by the transition from the unsaturated to the saturated state of the core of the saturable inductor. The latter is depicted by the curvature of the hysteresis loop near point B and is a function of the type and material of the core. Therefore, by proper choice of core material considerable control may be exercised over the rate of current build up, and, hence, the rate of rise of voltage across the load. When the load is a magnetron, such control of rate of rise of voltage is of particular importance.

For the short interval of time following the triggering of the switching device 18 during which the core of the inductor 12 remains unsaturated, the circuit is passing the magnetizing current limited by the inductance of the saturable inductor. Although in most applications this magnetizing current is of the order of 2% of the pulse current, the magnetizing current will serve to partially ionize a gas tube used as the switching device, thereby aiding in the formation of a high pulse current arc. This is of particular importance when an ignitron is used for the switching device. By providing a partial ionization, cooling water of a lower temperature can be used without affecting the current build up during the main pulse.

A further feature of the invention is derived from the fact that the start of the output pulse occurs at a fixed time after the fall of the anode voltage when a gas discharge tube is used as a switching device. The fall of voltage may, therefore, be conveniently used as a pre-pulse for controlling indicating or measuring equipment. For example, the pre-pulse may be used to start a CRO sweep to view the whole of the output pulse. Since there is no time jitter between the output and the pre-pulse, the sweep will always include the entire output pulse when once adjusted. This feature is advantageous when an ignitron is used as the switch.

Figure 3:
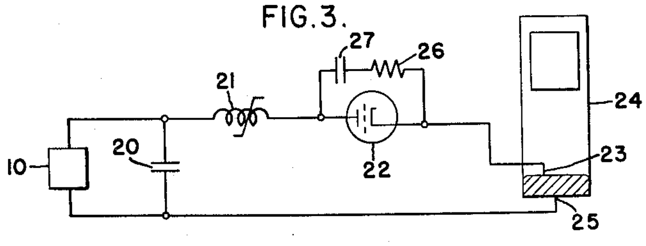
Figure 3 is a schematic diagram of a modification of the circuit shown in Figure 2.

Another embodiment of the invention for use with ignitron firing circuits is shown in Figure 3. This circuit is shown to include a source 10 and capacitor 20 connected in shunt with said source. One terminal of the capacitor is connected through the series combination of a saturable inductor 21 and a switching device 22, to the ignitor 23 of the ignitron 24. A second terminal of the capacitor is connected directly to the ground terminal 25 of the ignitron 24. A series resistance 26 and capacitance 27 is connected in shunt across the switching device 22.

In the usual ignitron firing circuit of this type the output current is limited by the inductance of an inductor circuit element. It is inherent in such an arrangement that a voltage of nearly the same magnitude as the forward voltage but of opposite polarity appears across the switch following the discharge.

In order to protect the switching device, it has been usual to shunt the switching device by means of a series resistor and capacitor. Such a circuit combination is effective only at low frequencies in keeping the rate of rise of the voltage of opposite polarity down to a permissible value. To be effective in a circuit designed to fire an ignitor in the time of the order of microseconds, the shunt resistance and capacitance assume values which would interfere with the normal recharging cycle of a storage capacitor.

In accordance with this embodiment of our invention, a saturable reactor is used as a circuit element. The saturable reactor is dimensioned so that the saturated inductance of the saturable core reactor is the value of the inductance required to limit the output current to the load. When the core is unsaturated, however, the inductance is dimensioned to be the highest impedance element in the circuit. In order to keep the size of the inductance within reasonable limits, the switch 22 is shunted by a series resistor 26 and capacitor 27. The effect of the shunt elements on the charging cycle can be made negligible because of the blocking action of the saturable core inductor 21.

The mode of operation of this circuit is as follows: During the charging cycle when capacitor 20 is charged from source 10, the saturable core inductance 21 is in the unsaturated state represented by point A, Figure 1. When the switching device 22 is triggered current starts to flow through the saturable core inductor carrying the core to the saturated state represented by point B, Figure 1. When the flux in the core reaches saturation the inductor assumes a very low value of inductance allowing discharge of capacitor 20 through the ignitor of ignitron 24. This current is limited by the saturated value of the inductance of the saturable core inductor 21. At the end of the discharge pulse, the current reverses and brings the reactor out of saturation, represented by point D in Figure 1. The inductance of the saturable core inductor 21 now becomes the highest impedance element in the circuit and the reverse voltage will appear across it until the core has been driven to saturation in the opposite direction. The inductance is designed to make this time interval long enough to allow a switch 22, when a gas discharge device is used, to deionize sufficiently to avoid anode sputtering by application of a large negative voltage to the anode.

In a circuit of this type, the full charging voltage of the network appears across the reactor during the time that the core is building up to saturation. In practice, the time taken for this build up of flux may be of the order of a fraction of a microsecond. Such a rate of change of flux will cause considerable eddy current loss in the core of the inductor which necessitates, particularly at high pulse repetition rates, careful design of the core to limit eddy current losses in a manner well known to the art and may necessitate special cooling means.

Secondary features of this circuit are a control of the rate of rise of pulse voltage by inductor design. Pre-pulse ionization of the switching device by the small magnetizing current flowing before saturation, and provision of a pre-pulse for triggering monitoring equipment. The provision for pre-pulse is a direct consequence of the time interval between triggering the switch and discharge of the network. This feature is, therefore, obtained at the expense of appreciable loss in the reactor core. In some circuits the provision of a pre-pulse without time jitter is not required. In this event, a significant reduction of core losses may be achieved by the modification shown in Figure 4.

Figure 4:
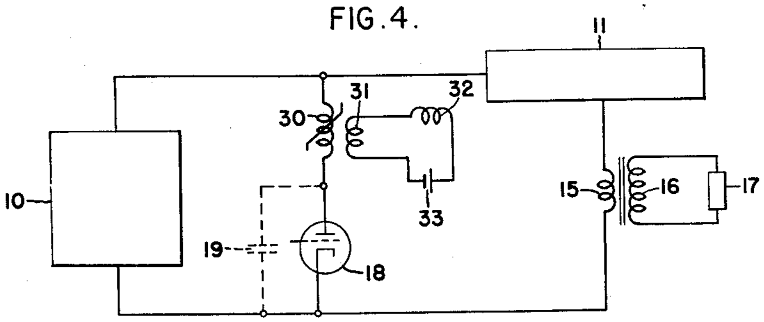
Figure 4 is a schematic diagram of another modification of the circuit shown in Figure 2.

In Figure 4 the circuit is shown to include elements similar to those shown in Figure 2 and elements are identically numbered. The circuit is shown to include a source 10 connected through a pulse forming network 11 to a terminal of a primary 15 of an output transformer. The other terminal of source 10 is connected directly to the other terminal on the output transformer primary. A serially connected saturable inductor 30 and a switching device 18, such as a thyratron, is connected in shunt across the terminals of source 10. A saturable core inductor has a biasing winding mounted on its core. The biasing winding 31 is energized through a blocking choke 32 from a source of direct voltage 33. As in Figure 2, the capacitor 19 represents stray capacitance across the switching device 18.

If the pulse forming network 11 is fully charged and the bias winding 31 of the saturable core inductor is arranged to bias the core to the degree represented by point B in Figure 1, the subsequent operation is the following: When the switch 18 is triggered, the inductor, already in the saturated state, offers low impedance to the flow of current and the pulse forming network immediately discharges through the load. The discharge current through the saturable core reactor will carry the core flux density up to point C in Figure 1. After discharge of main pulse, any residual reverse voltage will carry the core to point D when the inductor becomes unsaturated, becomes the highest impedance element in the circuit branch, and, therefore, drops the reverse voltage across its windings. After the current due to the reverse voltage ceases, the polarizing current through the auxiliary winding 31 will restore the core condition to point B of Figure 1, whereupon the circuit is re-set for a second pulse.

Since the interpulse period is available for swinging the flux from point G to point B, the rate of flux change which may be controlled by the polarizing supply voltage can be made relatively small with correspondingly small eddy current loss in the core. The major proportion of the loss in this case occurs while the reverse voltage is changing flux from point D to point F, but this is not a large loss as the change is relatively slow, taking place over a period of several microseconds. In this manner, the heating of the core of the saturable inductor is reduced and special cooling design is obviated.

A similar mode of operation of the circuit shown in Figure 4 is obtained if the reactor is connected between the pulse forming network 11 and the primary transformer 15. The effect of the polarizing current in this type of connection will be opposed by the network charging current until the charging current has fallen to a small value, thus leaving a small proportion of the interpulse period available for the polarizing supply to restore the core condition to the saturated state, represented by point B in Figure 1.

While particular embodiments of the present invention have been shown and described, it will be obvious to those skilled in the art that changes and modifications may be made without departing from the invention in its broader aspects, and, therefore the aim in the appended claims is to cover all such changes and modifications as fall within the true spirit and scope of the invention.

What we claim as new and desire to secure by Letters Patent of the United States is:

1. In combination, an ignitron firing circuit, a source of direct potential having first and second terminals, a first capacitor, said capacitor connected across said source, an ignitron having an ignitor terminal and a ground terminal, a saturable inductor, a gaseous discharge device, said inductor and device serially connected between the ignitor of said ignitron and said first terminal of said source, said ground terminal being directly connected to said second terminal of said source, and a resistor and second capacitor, said resistor and second capacitor being serially connected across said gaseous discharge means.

2. In combination, in an ignitron firing circuit, a source of direct voltage, energy storage means, said energy storage means comprising a linear capacitance connected in shunt with said voltage source, an ignitron having an ignitor, switch means and saturable reactor means coupling said ignitor to said energy storage circuit, said switch means adapted to discharge said energy storage circuit into said ignitor, said reactor means adapted to allow discharge of the energy storage circuit into said ignitor and to prevent flow of energy for the ignitor into said storage circuit immediately following said discharge.

3. In combination, a source of direct voltage, an energy storage circuit coupled to said source, a load circuit, said load circuit coupled to said energy storage circuit, a saturable core inductor, and a gaseous discharge device, said inductor and gaseous discharge device being serially connected across said source, said saturable inductor having biasing windings, said windings being adapted to adjust the initial magnetization of the core of said saturable core inductor.

4. In combination, a source of direct voltage, an energy storage circuit coupled thereto, a load circuit, a saturable core inductor, said inductor coupling said load circuit to said energy storage circuit, and switch means connected across said source, said means comprising a thyratron.

5. In combination, a source of undulating potential, an energy storage circuit coupled to said source, said energy storage circuit comprising capacitance, a controlled circuit, said controlled circuit having a first and second terminal, a saturable reactor and a gaseous discharge device serially connected between said first terminal and said energy storage circuit, said gaseous discharge device being adapted to couple said first terminal to said energy storage circuit when the energy in the storage circuit reaches a predetermined value, said saturable reactor being adapted to saturate and become a low value of inductance during discharge of the storage circuit and a high value of inductance at the end of said discharge, and means coupling said second terminal to said storage circuit.

6. In combination, a source of electric energy, an energy storage circuit coupled to said source, a load circuit, a saturable reactor, switch means recurrently rendered operable to discharge energy into said load circuit from said energy storage circuit through said reactor when the energy stored in said storage circuit reaches a predetermined value, said saturable reactor being responsive to operation of said switch means to saturate and become a low value of impedance during discharge of the storage circuit and a high value of impedance at the completion of said discharge.

7. In combination, a source of electric energy, an energy storage circuit coupled to said source, a load circuit, a saturable reactor, means recurrently rendered operable to discharge energy into said load from said energy storage circuit through said reactor, said saturable reactor being so dimensioned with respect to said source, energy storage circuit, and load circuit as to saturate and become a low value of impedance in response to said discharge and a higher value of impedance than said source, energy storage circuit, and load circuit in response to the completion of said discharge.

8. In combination, a source of electric energy, an energy storage circuit coupled to said source, an output circuit, saturable reactor means coupling said output circuit to said energy storage circuit, means recurrently rendered operable to discharge said storage circuit when the energy stored in said storage circuit reaches a desirable value, said saturable reactor means being responsive to said discharge to saturate and become a low value of impedance during said discharge and a high value of impedance at the completion of said discharge.

9. In combination, a source of electric energy, an energy storage circuit, a load circuit, a saturable reactor, said source, storage circuit, load circuit and saturable reactor being serially connected, and switch means for discharging said energy storage network, said switch means being connected in shunt with said source.

10. In combination, a source of electric energy, an energy storage circuit connected thereto, a load circuit, a saturable core inductor connecting said load circuit to said storage circuit, and a gaseous discharge device connected across said source for discharging said storage circuit.

References Cited in the file of this patent

UNITED STATES PATENTS

| | | |
|---|---|---|
| 2,436,395 | Manley | Feb. 24, 1948 |
| 2,727,159 | Sunderlin | Dec. 13, 1955 |
| 2,744,195 | Winokur | May 1, 1956 |
| 2,808,511 | Thulin | Oct. 1, 1957 |

FOREIGN PATENTS

| | | |
|---|---|---|
| 154,760 | Australia | Feb. 1, 1951 |